Figure 1:
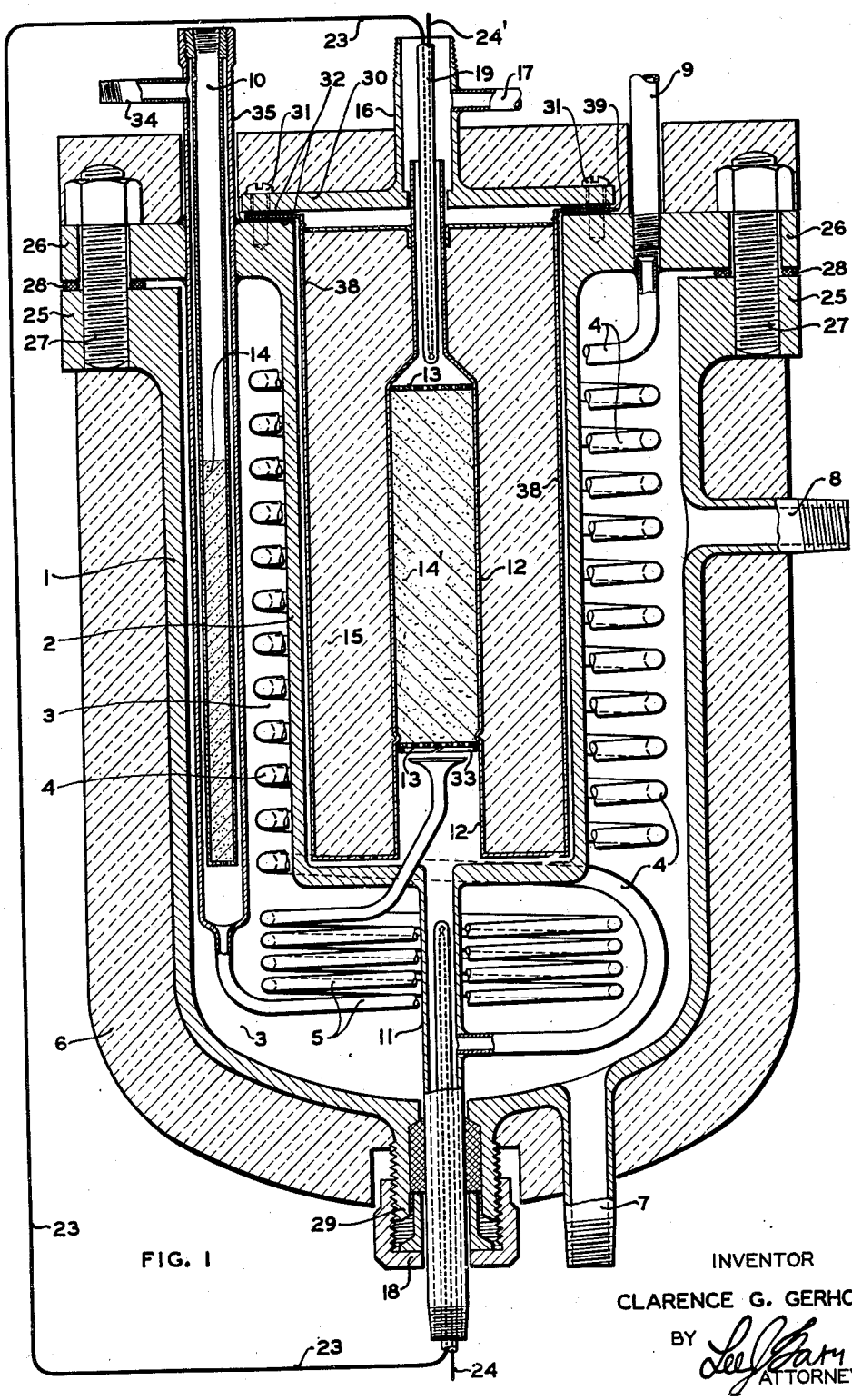

Jan. 22, 1946.　　C. G. GERHOLD　　2,393,362
GAS ANALYSIS AND CONTROL
Filed Feb. 26, 1940　　2 Sheets-Sheet 2

INVENTOR
CLARENCE G. GERHOLD
BY
Lee J. Gary
ATTORNEY

Patented Jan. 22, 1946

2,393,362

UNITED STATES PATENT OFFICE 2,393,362

GAS ANALYSIS AND CONTROL

Clarence G. Gerhold, Chicago, Ill., assignor to Universal Oil Products Company, Chicago, Ill., a corporation of Delaware Application February 26, 1940, Serial No. 320,812

2 Claims. (Cl. 252—186)

The invention provides an improved method and means of determining the oxidizing value of a mixture of gases containing oxygen and further provides an improved method and means of controlling the oxidizing value of such a mixture.

In many processes for the treatment of hydrocarbons involving the use of a mass of contact material, such as a catalyst which promotes the desired conversion reaction, heavy combustible deposits such as carbon or carbonaceous material accumulate on the contact mass during said treatment or conversion reaction and are periodically burned therefrom in a stream of oxygen-containing gases to renew the activity of the contact mass. In most instances, the oxidation reaction (reactivation of the catalyst or contact mass), which is, of course, an exothermic reaction, must be carefully regulated to avoid the development of excessive temperatures such as would result in destruction or permanent impairment to the activity of the contact material. This necessitates regulation of the oxygen content of the reactivating gases within close limits and, in addition, ordinarily involves controlled cooling of the reaction zone.

Ordinarily, the reactivating gas employed in such processes comprises a mixture of relatively inert gases, such as combustion gases, for example, containing a controlled relatively small percentage of free oxygen. When combustion gases are utilized for this purpose they are ordinarily generated in the absence of excess air, regulated amounts of air or oxygen being thereafter added to the combustion gases to form the reactivating gas stream which is passed in direct and intimate contact with the contact mass at a controlled temperature suitable for effecting oxidation of the combustible materials previously deposited therein.

One of the most difficult and troublesome problems encountered in the operation of processes of the general character above outlined, is that of controlling the oxygen content of the reactivating gases with sufficient precision to prevent the development of excessive temperatures in the contact mass during its reactivation. The present invention is particularly addressed to this problem and offers a direct and relatively simple solution of it. The invention is, however, not limited to this particular adaptation and use since its novel features will be found advantageous for numerous other purposes and are applicable to the determination of the oxidation value or oxygen content of gas mixtures in general and particularly those consisting essentially of relatively inert or non-combustible gases and oxygen.

Generally, the method provided by the invention comprises mixing a representative sample of the oxygen-containing gas to be analyzed with combustible gas, such as, for example, hydrogen or hydrocarbon gas, in quantities in excess of that theoretically required for complete consumption of the maximum quantity of oxygen which the sample may contain, effecting oxidation of the combustible components of the mixture in a closed combustion zone, operated under essentially adiabatic conditions, to a point where said oxygen is consumed and measuring the resulting increase in the temperature of the mixture as an index to its oxidizing value.

Preferably, the combustion zone is insulated to reduce the heat loss therefrom to a negligible amount and, to simplify this problem, I preferably employ a material in the combustion zone which catalyzes or otherwise promotes oxidation and thereby reduces the required temperature in the combustion zone, both the oxygen-containing gas stream and the stream of combustible gases being separately heated to a temperature at which the desired oxidation will occur upon contact of the mixture with the oxidation promoter. Preferably, the two streams are so heated that they enter the zone wherein they are commingled at substantially the same temperature and, to determine the temperature rise resulting from oxidation, a two junction thermocouple is provided with one junction disposed in one of said streams of gases at a point immediately ahead of the mixing zone and the other junction disposed in the stream of hot gases leaving the combustion zone or at a point in the latter at which the oxygen content of the gases has been consumed. The thermocouple circuit is connected to a suitable temperature indicating or recording instrument which translates the difference in potential generated at the two thermocouple junctions into temperature difference.

Preferably, the combustible gas added to the mixture of oxygen-containing gases is of known and substantially constant thermal value so that the temperature rise effected by its combustion may, when desired, be directly translated into a figure representing the oxygen content of the non-combustible gas mixture undergoing analysis for oxygen. This translation is accomplished by means of a formula or chart based on the known thermal value of the combustible gas utilized.

As applied to the automatic control of oxygen content in a stream of non-combustible gases to which oxygen or air is added, a control instrument of the potentiometer type, responsive to changes in the potential generated in the aforementioned thermocouple circuit and adjusting a flow controller which regulates the amount of air or oxygen admitted to said stream of non-combustible gases, is employed to vary the quantity of air or oxygen supplied to said stream in response to minor variations in the temperature rise in said combustion zone and thereby maintain the proportion of oxygen to the other components of said stream substantially constant.

In the accompanying drawings, Figure 1 is an elevational view, showing principally in section, of an apparatus embodying the features of the invention for determining the oxidizing characteristics of a gas mixture.

Figure 2:
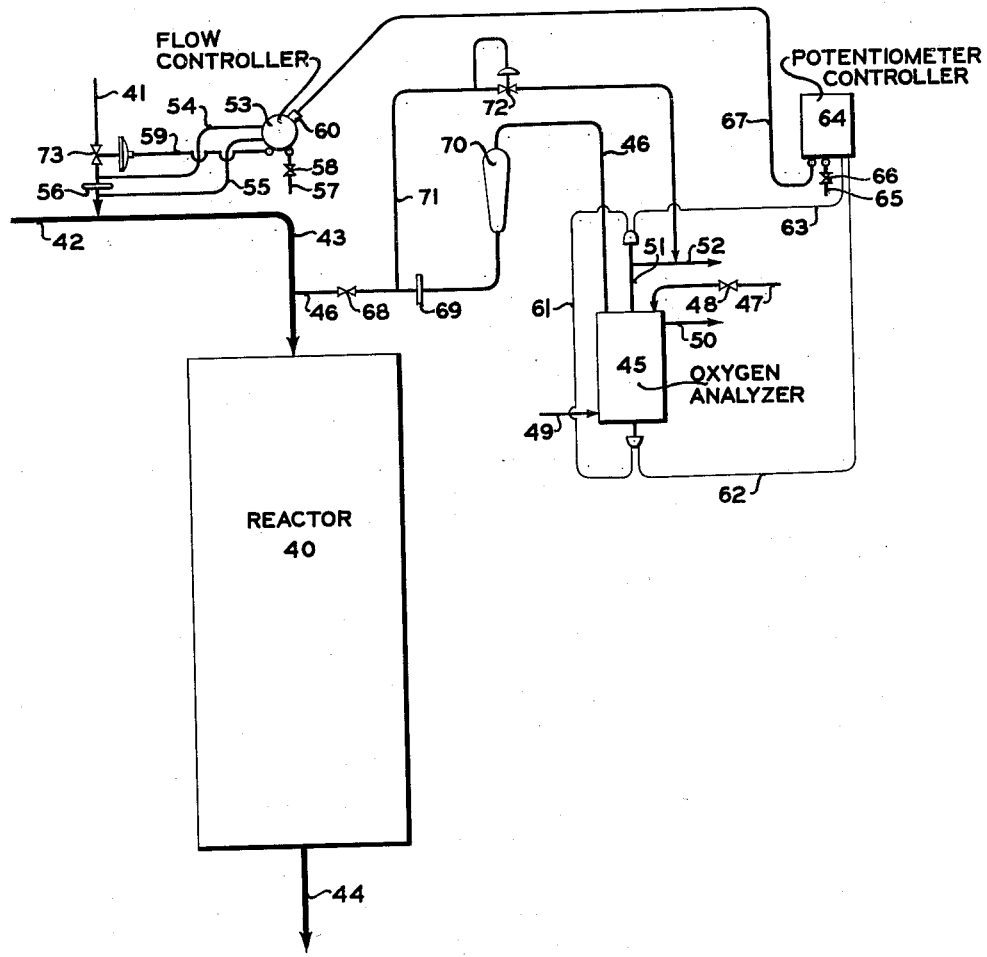

Figure 2 is a flow diagram illustrating the adaptation of the features of the invention to the automatic control of oxygen content in a stream of gases employed for reactivating a mass of contact material containing combustibles deposited therein during a previous hydrocarbon conversion reaction in a recreation zone containing said contact mass.

Referring to Figure 1, the specific form of apparatus here illustrated is one of the class provided by the invention in which a combustion promoter or catalyst, such as, for example, platinized asbestos, or nickel oxide on an insert carrier, such as kieselguhr, is employed to reduce the temperature required to initiate combustion, thus permitting relatively low preheating temperatures for the gas to be analyzed and the combustible gas, and employing a fluid heating medium such as steam to accomplish this preheating and to jacket the combustion zone.

A substantially cylindrical outer shell 1 and a substantially concentric inner shell 2, capable of withstanding the steam pressure employed, are provided with a space 3 therebetween in which preheating coils 4 and 5 are disposed. Suitable insulation, indicated at 6, is provided around the outer shell to conserve heat and steam is admitted to space 3 through line 7 and removed therefrom through line 8.

The gas to be analyzed for oxygen content, such as, for example, a mixture of combustion gases and air, is supplied to coil 4 in regulated amounts through line 9. A fuel gas of known calorific value is supplied through line 10 to heating coil 5 in quantities in excess of that required to substantially completely consume the oxygen in the stream to be anaylzed. Hydrogen, for example, is an excellent fuel for this purpose but, as normally produced, may contain varying amounts of oxygen. I have, therefore, provided for eliminating oxidizing contaminants from the fuel gas stream, when required, by disposing suitable oxidizing promoting material 14, such as, for example, platinized asbestos, nickel oxide on kieselguhr or the like within a portion of tube 10 which is disposed in the heating zone of the apparatus and through which material the fuel gas is passed and its oxidizing components therein are consumed.

Each of the two streams of preheated gases is admitted from the coil wherein it is preheated to the lower portion of tube 12, wherein they commingle, and are thence directed into the combustion zone which, in the case here illustrated, comprises the mid-portion of tube 12, which is preferably composed of oxidation and corrosion resistant material capable of withstanding the combustion temperature prevailing in this zone, such as, for example, high temperature glass, fused quartz, chromium-nickel steel or the like. A chromium-nickel steel tube is employed in the case here illustrated.

Tube 12 is disposed in jacket 2 and the space therebetween is preferably filled with suitable insulating material 15 such as, for example, exfoliated vermiculite or silica aerogel with reflective particles such as silicon added thereto which retard the transmission of both radiant and convective heat. Suitable perforate discs 13, of mica or the like, are provided adjacent opposite ends of tube 12 and the space therebetween is filled with platinized asbestos or other suitable oxidation catalyst or promoter indicated at 14'. The hot gases leaving the bed 14' pass through the upper portion of tube 12 through line 16 and are discharged from the apparatus through line 17.

In most instances, the oxygen content of the stream of gases to be analyzed will be sufficiently high to cause a substantial temperature rise in the zone of tube 12 wherein oxidation occurs and, since oxidation is accomplished under essentially adiabatic conditions, utilizing a fuel of known calorific value, this temperature rise is a direct index to the oxygen content of the sample. However, in some instances, the oxygen content of the sample may be so low that the temperature rise will be difficult to determine accurately. Furthermore, after the oxidizing catalyst in tube 12 has been used for a considerable period of time, its activity may be reduced to a point where a substantial proportion of the small quantity of oxygen in the gas stream to be analyzed is not consumed. Under such conditions, I contemplate supplying a predetermined additional quantity of oxygen to the apparatus to increase the oxygen concentration of the gas stream to be analyzed by a fixed amount, whereby to materially increase the temperature rise which occurs in the oxidizing zone and improve the accuracy of the apparatus. This may be accomplished in any desired manner and, in the particular case here illustrated, a quantity of air or oxygen in essentially unvarying proportions to the quantity of gas supplied to the apparatus through line 9 is admitted through line 34 to tube 35, wherein it passes through the annular space provided between this tube and tube 10, is heated as it passes therethrough and commingles in the lower portion of tube 35 with the purified fuel gas passing from tube 35 to heating coil 5. Suitable proportioning means of any well known form, not illustrated, may be provided for keeping a quantity of air or oxygen supplied through line 34 in fixed proportional relation to the quantity of oxygen-containing gases supplied through line 9 and the instrument which indicates or records the temperature increase in the combination zone may be calibrated to compensate for the fixed quantity of oxygen added.

The temperature-sensitive device, such as a thermocouple housed in sheath 18, is disposed in conduit 11 with its junction at approximately the point of introduction of one of said streams of heated gases supplied to this conduit. This is the relative cold junction of the thermocouple circuit and is preferably so located that it responds to the temperature of only one of said streams of preheated gases before it is commingled with the other preheated stream, thereby avoiding the possibility of any oxidation and temperature rise at the point in the gas stream where this junction is located. A similar temperature-sensitive device or thermocouple is located within sheath 19 which extends through line 16 into the upper portion of combustion tube 12 with the junction of this thermocouple disposed at the lower end of the sheath in a position adjacent the point of discharge of the heated gases from catalyst bed 14', so as to be exposed to these gases at their maximum temperature.

Thermocouple heads of any conventional form, not illustrated, are provided at the outer ends of conduits 16 and 11 to close these conduits against the escape of gases therefrom.

Iron-constantan, platinum-rhodium or any other desired conventional type of thermocouple may be employed in each of the sheaths 18 and 19 and in order to determine the difference in temperature between the cold junction and the hot junction, one wire, such as, for example, a constantan wire, indicated at 23, is common to both couples and connects, for example, two iron wires 24 and 24' at the cold and hot junctions. The difference in potential generated in the two junctions will vary with variations in the temperature difference between these two points and is transmitted through wires 24 and 24' to any conventional form of indicating or recording instrument, such as a potentiometer, which translates the electrical energy into a temperature reading or, as indicated in Figure 2 and more fully explained in conjunction therewith, the potentiometer, when desired, may function, as will be later explained in conjunction with Figure 2, as part of a control system which regulates the amount of air or oxygen admitted to the stream of gases to be analyzed, thereby controlling the oxygen content of this stream.

The details of the apparatus provided may be varied considerably from those shown in the drawings without departing from the scope of the broader features of the invention. However, the essential structure details of the apparatus illustrated in Figure 1 have several advantages which will now be explained.

The outer shell 1 is flanged, as indicated at 25, at its upper end and provided with a detachable head 26 held in place by bolts 27 with a gasket 28 provided between flange 25 and head 26 to prevent the escape of steam from space 3. The entire assembly comprising coils 4 and 5, tubes 9, 10, 16, 17, 34 and 35, shell 2, conduit 11, combustion tube 12 and the catalyst contained therein, as well as insulation 15, is mounted on cover plate 26 and removable therewith from shell 1 when the head is detached, a packing gland 29 being provided at the lower end of shell 1 to prevent the leakage of steam from space 3 around conduit 11. This makes coils 4 and 5, tube 11, conduit 35 and shell 2 readily accessible for inspection and repair or replacement, when required.

A smaller detachable head 30 is secured to head 26, by means of bolts 31, with gaskets 32 provided therebetween. Conduits 16 and 17 are mounted on member 30 and communicate with the interior of tube 12. The lower perforate disc 13 is retained in place in tube 12 by expansion ring 33. Thus, by detaching head 30 from member 26, the parts mounted on this head are removed from shell 2, making tube 12, the catalytic material 14' and insulation 15 accessible for replacement, when required. Preferably, and particularly when insulating material 15 is not in the form of a homogeneous mass the insulating material is disposed in a suitable envelope or shell 38 which is outwardly flanged at its upper end as indicated at 39, the flange being disposed between flange 26 and the removable head 30. Thus the insulating material is withdrawn from shell 2 with tube 12 so that it will not fall out of place and give trouble when the tube is again inserted in shell 2. Shell or envelope 38 may advantageously be constructed of thin metal having a bright or polished surface to serve as a reflective insulator.

Referring now to Figure 2, a reactor containing one or more beds, not illustrated, of catalytic or contact material which has become fouled by the deposition thereon of combustible material is indicated at 40. To reactivate the catalyst or contact mass, a stream of air or oxygen supplied through line 41 is commingled in line 42 with heated relatively inert gases, such as combustion gases, which may be substantially free of uncombined oxygen or may contain varying smaller percentages of free oxygen than that desired in the reactivating gas stream and which are supplied through line 42 at a substantially constant rate. The reactivating gas mixture is directed through line 43 to the reactor and contacts the bed of fouled catalyst in the reactor, burning the carbonaceous material therefrom to effect its reactivation. The spent or partially spent reactivating gases and resulting combustion products are discharged from the reactor through line 44 and, in many instances, it is advantageous to recycle regulated quantities of the exit gases back to line 42 after removing deleterious materials, such as ash and sulfur compounds, therefrom and readjust their temperature to the desired value. However, since these exit gases may contain varying amounts of unused oxygen, their recirculation complicates the problem of maintaining a constant oxygen concentration in the reactivating gas stream supplied to the reactor through line 43 even though the quantity of air or oxygen admitted through line 41 and the quantity of gases admitted through line 42 are kept proportionally constant.

To overcome this difficulty, I provide a method and means of maintaining the oxygen content of the reactivating gas stream entering the reactor at the desired substantially constant value. An oxygen analyzer 45 of the type provided by the invention and which may, for example, be of the form shown in Figure 1 is provided and a relatively small stream sample of the reactivating gas mixture is supplied from line 43 through line 46 to the oxygen analyzer 45. Hydrogen or other combustible fuel of known colorific value is supplied to the analyzer through line 47 and valve 48 in quantities in excess of that required to consume the oxygen content of the gas stream supplied to the analyzer through line 46. The operation of the analyzer is the same as that described in conjunction with Figure 1, steam being admitted as the heating medium through line 49 and discharged from the analyzer through line 50 and the analyzed gases, from which oxygen has been substantially completely burned, are discharged from the analyzer through lines 51 and 52.

In order to maintain the quantity of the sample gas stream supplied to the oxygen analyzer substantially constant, a manually operated valve 68 is provided in line 46 and is opened sufficiently to allow the passage of a somewhat larger volume of gases than that to be supplied to the analyzer.

An orifice plate 69 having a fixed orifice opening therethrough is provided in line 46 on the down stream side of valve 68 and a flow-indicating instrument of any suitable conventional form, such as a rotometer, indicated at 70, is disposed in line 46 between the oxygen analyzer and orifice plate 69. A by-pass line 71 connects line 46 between valve 68 and orifice plate 69 to discharge line 52 from the oxygen analyzer and a back pressure control valve 72 disposed in line 71 maintains a substantially constant pressure on the up stream side of orifice plate 69.

A flow controller 53, communicating through conduits 54 and 55 with line 41 on opposite sides of an orifice plate 56 disposed in this line, controls the quantity of air supplied to line 42 through line 41 by regulation of valve 73 in line 41. Valve 73 is of the diaphragm type actuated by air supplied thereto from controller 53 through line 59. Air for actuating valve 73 is admitted to controller 53 through line 57 and valve 58 and the difference in pressure in lines 54 and 55 operates through the controller to increase and decrease the air pressure in line 59. The setting of the controller is adjustable and the setting mechanism is actuated for changing the adjustment by a bellows 60.

A wire 61, which comprises a portion of a thermocouple system, such as described in conjunction with Figure 1, connects the hot and cold junctions of the thermocouple system of oxygen analyzer 45, the other two wires 62 and 63 of the thermocouple system communicating with a potentiometer controller 64 to which air is supplied under pressure through conduit 65 and valve 66. Impulses transmitted to the potentiometer from the thermocouple system function through the potentiometer controller to regulate the admission of air from conduit 65 to conduit 67 connecting the potentiometer controller with bellows 60 of flow controller 53.

The operation of the control system, above described, is as follows: With high temperature difference between the two thermocouple functions of analyzer 45, indicating an excess of oxygen in the stream of reactivating gases being supplied to reactor 40, the potentiometer controller operates to decrease the air pressure in conduit 67 and bellows 60 moving the setting of the flow controller back to a lower position so that the setting of valve 73 is readjusted to restrict the opening therethrough and admit less air from line 41 to line 42. When the temperature difference between the thermocouple junctions of the oxygen analyzer is low, indicating a deficiency of oxygen in the reactivating gas stream being supplied through line 42 to reactor 40, the potentiometer controller functions to increase the air pressure in line 67 and bellows 60, readjusting the setting of the flow controller to a higher position and decreasing the air pressure in conduit 59 whereby valve 73 is opened to a greater extent and more air is admitted through line 41 to line 42.

Each of the several control instruments employed including rotometer 17, the re-set type of flow controller 53 and potentiometer controller 64 may be of conventional form and, since they are each well known per se, an illustration of the working mechanism of the several instruments is considered superfluous.

It is also within the scope of the invention to employ other well known forms of control instruments for regulating the amount of air admitted to line 42 in response to changes in the temperature difference between the two thermocouple junctions of the oxygen analyzer. For example, instead of the air actuated control mechanism which is a part of potentiometer controller 64 and instead of the air actuated flow controller 53, I may employ a potentiometer adapted to supply electrical energy to a motor or solenoid operated type of valve in line 62, in response to changes in the temperature difference between the two thermocouple junctions or, preferably, the valve in line 41 is actuated by air or other fluid under pressure admitted to the operating mechanism of the valve through a line having an electrically operated valve therein which is controlled from the potentiometer.

I claim:

1. A method of determining the oxidizing value of an oxygen-containing gas mixture which comprises preheating a stream of said mixture to a predetermined temperature, separately preheating a stream of combustible gas of known thermal value to substantially the same temperature as the first-mentioned stream, commingling the preheated combustible gas stream with the preheated stream of said mixture in an amount in excess of that required to completely consume the free oxygen content of said mixture, subjecting the thus commingled streams to combustion under substantially adiabatic conditions to consume said free oxygen, and measuring the difference between the temperature of the resultant hot combustion gases and the temperature of one of said preheated streams prior to its commingling with the other preheated stream.

2. In a process wherein oxygen is added to a flowing gas to form an oxidizing gas mixture, the method of control which comprises preheating a stream of said mixture to a predetermined temperature, separately preheating a stream of combustible gas of known thermal value to substantially the same temperature as the first-mentioned stream, commingling the preheated combustible gas stream with the preheated stream of said mixture in an amount in excess of that required to completely consume the free oxygen content of said mixture, subjecting the thus commingled streams to combustion under substantially adiabatic conditions to consume said free oxygen, measuring the temperature differential between the resultant hot combustion gases and one of said preheated streams prior to its commingling with the other stream, and regulating the addition of oxygen to said flowing gas in response to variations in said temperature differential.

CLARENCE G. GERHOLD.